(12) United States Patent
Meyer et al.

(10) Patent No.: US 10,979,318 B2
(45) Date of Patent: Apr. 13, 2021

(54) ENHANCING RESOURCE ALLOCATION FOR APPLICATION DEPLOYMENT

(71) Applicant: Oracle International Corporation, Redwood Shores, CA (US)

(72) Inventors: Timothy Meyer, Belmont, CA (US); Xiao Liu, San Francisco, CA (US); Ying Gao, San Jose, CA (US); Jeffrey Doering, Bend, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 124 days.

(21) Appl. No.: 15/889,986

(22) Filed: Feb. 6, 2018

(65) Prior Publication Data
US 2019/0245757 A1 Aug. 8, 2019

(51) Int. Cl.
| | |
|---|---|
| *H04L 12/24* | (2006.01) |
| *G06N 20/00* | (2019.01) |
| *G06F 9/455* | (2018.01) |
| *G06F 8/60* | (2018.01) |
| *G06F 9/50* | (2006.01) |
| *H04L 12/911* | (2013.01) |
| *H04L 29/08* | (2006.01) |

(52) U.S. Cl.
CPC .......... *H04L 41/5041* (2013.01); *G06F 8/60* (2013.01); *G06F 9/45558* (2013.01); *G06F 9/5016* (2013.01); *G06F 9/5027* (2013.01); *G06N 20/00* (2019.01); *H04L 47/70* (2013.01); *G06F 2009/4557* (2013.01); *G06F 2009/45595* (2013.01); *H04L 41/14* (2013.01); *H04L 67/10* (2013.01)

(58) Field of Classification Search
CPC ..... H04L 41/5041; H04L 47/70; H04L 41/14; H04L 67/10; H04L 41/145; H04L 41/16; H04L 41/5051; H04L 41/5096; G06N 20/00; G06N 3/126; G06N 7/005; G06F 8/60; G06F 9/45558; G06F 9/5016; G06F 9/5027; G06F 2009/4557; G06F 2009/45595; G06F 9/4027; G06F 9/5072; H04N 47/70
See application file for complete search history.

(56) References Cited

U.S. PATENT DOCUMENTS

| | | | | |
|---|---|---|---|---|
| 8,713,147 | B2* | 4/2014 | Ferris | G06Q 30/02 709/223 |
| 9,467,355 | B2* | 10/2016 | Doering | H04L 41/50 |

(Continued)

*Primary Examiner* — Alina A Boutah
(74) *Attorney, Agent, or Firm* — Kilpatrick Townsend & Stockton LLP

(57) ABSTRACT

In certain embodiments, a Service Deployment Infrastructure (SDI) instance is disclosed. The SDI instance can intelligently allocate resources of a rack to one or more virtual machines as part of provisioning a requested service. The SDI instance can use machine-learning techniques to evaluate historical data associated with a requested service. The machine-learning techniques can be used to generate one or more models that simulate the possible configurations of sizes for virtual machines for a particular service. The one or more models can be accessed at runtime to fit virtual machines of a requested service into servers of a rack in a manner that minimizes unused resources with multi-dimensional constraints.

20 Claims, 12 Drawing Sheets

(56) References Cited

U.S. PATENT DOCUMENTS

| | | | |
|---|---|---|---|
| 10,142,174 B2 * | 11/2018 | Yang | H04L 41/5054 |
| 2012/0131176 A1 * | 5/2012 | Ferris | G06F 9/5072 |
| | | | 709/224 |
| 2015/0365301 A1 * | 12/2015 | Chatterjee | H04L 47/808 |
| | | | 709/226 |
| 2018/0316621 A1 * | 11/2018 | Ferris | G06F 9/5072 |
| 2018/0332138 A1 * | 11/2018 | Liu | H04L 41/5041 |

* cited by examiner

ENHANCING RESOURCE ALLOCATION FOR APPLICATION DEPLOYMENT

TECHNICAL FIELD

The present disclosure relates to computer systems for enhancing the allocation of resources for provisioning services in cloud computing systems. More particularly, the present disclosure relates to systems and methods for enhancing the allocation of resources with multiple-dimensional constraints for provisioning services in cloud computing systems.

BACKGROUND

Cloud computing is a model for enabling efficient, on-demand network access to a shared pool of configurable computer resources (e.g., networks, servers, processors, storage, applications, and services). The services provided or accessed through a cloud network are referred to as cloud services. Provisioning a cloud service can include reserving a specific set of computer resources to enable the cloud service. For example, allocating a resource can involve reserving resources (e.g., a specific processor and/or an amount of memory) from a shared pool of resources available to a rack, and preventing other cloud services from accessing the reserved resources. The reserved resources can be used to generate an instance of the cloud service to be provided to users.

A cloud infrastructure may include certain provisioning management computer device(s) configured to provision cloud resources to enable cloud services. The provisioning management computer device(s) may perform tasks that reserve resources for virtual machines used to deploy a new instance of a service. However, reserving resources for virtual machines is often inefficient and can be computationally burdensome on processing resources because the size of virtual machines and a number of virtual machines needed to process a future request for a service is unknown. Further, resources may be reserved on servers for virtual machines without considering a balance between multiple dimensions of resources (e.g., memory and CPU usage). Servers within a rack may become full due to running out of memory, however, these servers may have a significant amount of unused CPUs. Other servers within that rack may become full due to running out of CPUs, but may have a significant amount of unused memory available. This imbalance of resource usage is inefficient because servers may fill up while large amounts of resources are still unused. Additionally, in some cases, the provisioning management computer device(s) may reserve resources for virtual machines by evenly splitting the unused resources of the shared pool of resources amongst virtual machines. However, evenly splitting unused resources may prevent new virtual machines of certain sizes from being allocated to the rack in the future, even though a large amount of unused resources remain.

BRIEF SUMMARY

Embodiments are disclosed for using a computing system to enhance the allocation of resources to provision cloud-based services in a computer infrastructure system. Specifically, techniques are disclosed for intelligently allocating resources from a shared pool of resources so that unused resources of the shared pool of resources are optimized for future allocation. These techniques, including the computer infrastructure system, may be implemented in many different computer environments, such as an enterprise computer system and a cloud computing system.

In certain embodiments, a computer infrastructure system includes a service deployment infrastructure (SDI), which is implemented by a computer system. The SDI can perform an intelligent allocation of resources for provisioning services of the computer infrastructure system. In certain embodiments, the SDI processes large volumes of requests to provision cloud services, determines which resources of a shared pool of resources to reserve for each of the requests, and deploys services corresponding to each of the provisioning requests in the cloud computing system.

In some implementations, a request may indicate an order (e.g., a subscription order) for one or more services requested by a user (e.g., customer). The SDI, or another device of a computer infrastructure system, can identify a set of one or more tasks associated with each of the services and can store information associated with each of the services and the corresponding task in a database. In some embodiments, the SDI schedules the processing tasks associated with each request. In certain embodiments, the SDI may assign various states to a service request based on assigned states of tasks associated with the service request. Upon successful execution of the tasks associated with a service request, the SDI can provision resources (e.g., memory and processors) for a cloud service included in a request. For example, a first task can indicate provisioning of a first resource (e.g., a logical or physical processor) of a rack and a second task can indicate provisioning of a second resource (e.g., memory) of the same rack. According to embodiments disclosed herein, the SDI can allocate the first resource to a first set of virtual machines, and the second resource to a second set of virtual machines, such that the unused resources of the rack are minimized.

In certain embodiments, a computer system may provide support for executing instances of one or more virtual machines. The computer system may execute a program such as a hypervisor for facilitating the configuring, managing, and assignment of multi-dimensional resources of the virtual machines. Each virtual machine may be allocated a set of resources. The set of resources may have multiple dimensions. For example, one dimension of resource may be a memory allocated to a virtual machine from a total memory available to a rack. Another dimension may be a number of processor cores allocated to the virtual machine from a total number of processor cores available to the rack. Other dimensions may include, for example, I/O and networking resources. Each virtual machine typically runs its own operating system, which may be the same as or different from the operating systems executed by other virtual machines executed by the computer system. Accordingly, multiple operating systems may potentially be run concurrently by the computer system. Each virtual machine generally runs independently of the other virtual machines.

A rack can be an example virtual construct of various resources within a computer infrastructure system. A rack can contain memory, CPUs, server pools, or other devices or logical constructs within a computer infrastructure system. An instance of a rack can be implemented as including a specific set of resources that can commonly be used to enable one or more services or service types. Racks can dynamically be altered or updated by the computer infrastructure as needed to meet the various demands of the services of the computer infrastructure system. By defining racks, provisioning of resources can be simplified. For example, a task can request a rack type in place of a set of tasks that each request provisioning of a resource of a rack. In certain embodiments, a rack may include a set of servers (e.g., 30 servers) that are configured for a particular service. The rack may have a total amount of shared resources. For example, the rack may be allocated a total of 10 Gigabytes of memory and 12 processor cores. In this example, the 30 servers are wired to work together as the rack and may share the pool of resources, including the 10 GB of memory and the 12 processor cores. Racks can include variously defined network domains of resources such as, a subnet, gateway, or a server pool.

In certain embodiments, the SDI can evaluate existing racks in datacenters to generate a model that simulates incoming requests from users for cloud services. In some cases, simulating incoming requests from users can include simulating potential configurations of virtual machines (e.g., sizes of virtual machines, such as 1 GB of memory) for the cloud services requested by users. Racks are configured for a particular cloud service. For example, if a rack included 30 servers, the virtual machines that would be generated on the 30 servers would support that particular service. The potential configurations of virtual machines for a particular cloud service (e.g., that a user could potentially request) can be learned or deduced from existing racks housed in datacenters. The potential configurations of virtual machines may include a size of the service (e.g., an amount of memory needed for the virtual machines, or a number of virtual machines needed). In some examples, potential configurations of virtual machines may also include add-on options to the service (requested by the user) that might require an additional virtual machine or a slight upsizing of a virtual machine.

To illustrate and only as a non-limiting example, the generated model may indicate that there are three main configurations of virtual machines (e.g., configurations A, B, and C) that users typically request for cloud service X. Further, the model may indicate that there are five different add-on options that alter resource requirements in a deterministic way. For example, the five different add-on options may include a0 through a4. For example, the probability of configuration A may be 50%, configuration B may be 30%, and configuration C may be 20%. Further, the probability of a user requesting the cloud service with a0 is 10%, a1 is 5%, a2 is 90%, a3 is 50%, and a4 is 20%. An SDI instance may access the model at runtime of a placement algorithm to determine which servers of a rack to map to the virtual machines needed to provide the cloud service, per the user's request.

Because incoming orders for services require a placement of an unknown number of virtual machines of an unknown size, placement of virtual machines to servers of a rack for a requested service may be enhanced, so as to reduce unused resources, by evaluating the generated models at runtime of the placement. In certain embodiments, placement can include selecting a rack from a plurality of racks. The selection of the rack may be based on priority settings associated with the rack. For example, a rack with a higher priority setting may be selected prior to a rack with a lower priority setting. In some cases, the priority setting may be user defined. In some cases, the priority setting may be based on one or more machine-learning techniques. Additionally, the selected rack corresponds to the service requested by the user because racks are generally configured for a particular service.

In certain embodiment, when a rack has been selected, the set of virtual machines that are needed to provide the requested service are placed, individually and sequentially from the largest virtual machine, into servers of a rack. Further, placement of the virtual machines includes, for each virtual machine, generating a score for all of the servers in the rack with respect to the virtual machine, and selecting the highest scoring server of the rack to place that virtual machine.

In certain embodiments, scoring the servers for placement of a virtual machine may include generating a score with one or more components. For example, a component of the score may include a "fill" score. The "fill" score may indicate a degree to which an empty server is preferred. In some cases, the "fill" score may indicate a degree to which a server that is partially filled is preferred. In cases where the "fill" score indicates that an empty server is preferred, the score for an empty server will be higher (or otherwise may be better) than the score for a partially full server. Doing so biases placement of virtual machines to empty servers in a rack, and away from partially full servers. In some cases, a component of the score may include a "fit" score. The "fit" score may indicate how well the virtual machine fits into a server of the rack, considering remaining unused resources after placing the virtual machine. For example, if the computer system identifies (through the modeling steps described above) that 20 GB is the smallest virtual machine to have been placed in previous instances of provisioning the service, the "fit" score will defined to bias servers to keep at least 20 GB of free space available. In this example, if placing a virtual machine to a server results in 19 GB of unused memory remaining, then that server will have a negative score (or otherwise generally a worse score than if 20 GB or more were remaining unused). However, if placing the virtual machine to that server results in 20 GB or more remaining unused, then a positive score (or otherwise better score) would be calculated for that server to bias or encourage placement into that server. In certain embodiments, a component of the score may include a "balance" score. The "balance" score is defined to penalize heavily using a resource in one dimension over another dimension. For example, if placing a virtual machine into a server causes that server to use more memory than CPU's, then the "balance" score would be calculated to penalize placing virtual machines into that server. Conversely, if placing the virtual machine into the server causes that server to use a balanced amount of memory and CPU (or other resources), then the "balance" score would be calculated to bias placement of virtual machines into that server. As described above, a score is calculating for each server in the rack with respect to a particular virtual machine that has yet-to-be placed into a server. The server with the highest score may be selected for placement of the virtual machine. Further, in certain embodiments, the components of the score can be combined as a weighted combination, where the weight of a score component is learned using one or more machine-learning techniques on an iterative basis.

Techniques disclosed herein can include collecting, by a computer infrastructure system, historical provision data for one or more racks. Each rack of the one or more racks may be associated with one or more servers that provisioned a cloud application. For example, the historical provision data may include at least one allocation of a resource to one or more virtual machines used to run an instance of the cloud application. The techniques may further include analyzing the historical provisioning data using one or more machine-learning techniques, and generating, based at least in part on the analyzing, one or more models that represent resource usage characteristics of the at least one allocation of the resource to the one or more virtual machines. A request for the computer infrastructure system to provision a new instance of the cloud application may be received. The techniques may include determining a set of virtual machines for the new instance of the cloud application. The set of virtual machines may be determined based at least in part on the request. Further, the techniques may include selecting a rack from a plurality of racks. The selected rack may be configured to run the new instance of the cloud application. Further, the selected rack may correspond to a set of servers, and each server of the set of servers may be associated with a resource. The techniques may further include executing a placement protocol for the selected rack. The placement protocol may use the one or more models to map each virtual machine of the set of virtual machines to a server of the set of servers. The mapping may cause at least a portion of the resource to be allocated to each virtual machine of the set of virtual machines. The techniques may include provisioning the new instance of the cloud application using the set of virtual machines.

Some embodiments may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Illustrative embodiments of the present invention are described in detail below with reference to the following drawing figures.

DETAILED DESCRIPTION

Figure 1A:
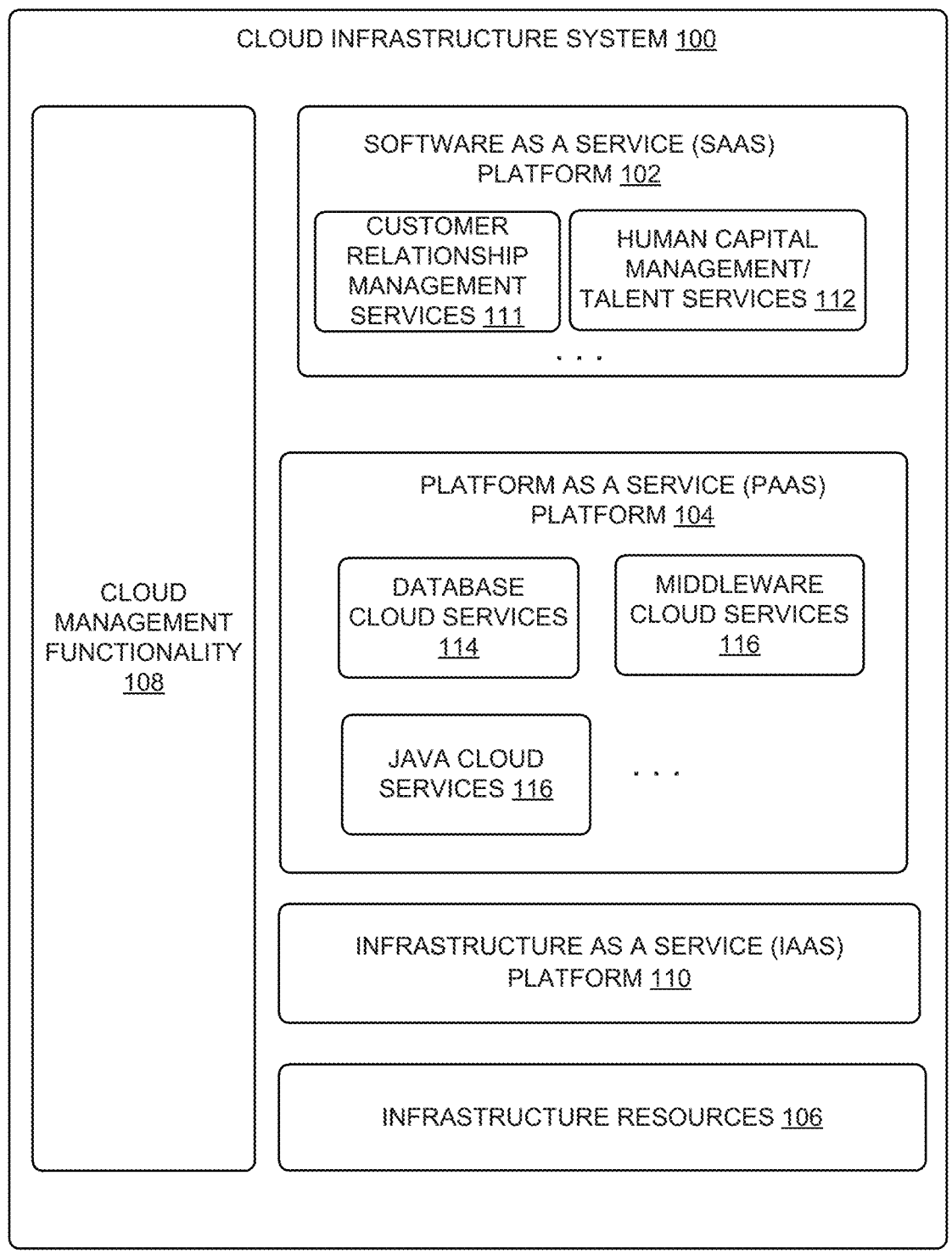
FIG. 1A is a logical view of a cloud infrastructure system according to one embodiment.

In the following description, for the purposes of explanation, specific details are set forth in order to provide a thorough understanding of embodiments of the present disclosure. However, it will be apparent that various embodiments may be practiced without these specific details. The figures and description are not intended to be restrictive.

Certain embodiments provide techniques for enhancing the allocation of resources for provisioning cloud services provided by a cloud infrastructure system. An example of such a computer infrastructure system is a cloud infrastructure system such as the Oracle Public Cloud provided by the present assignee.

In certain embodiments, a computer infrastructure system may include a suite of applications, middleware and database service offerings that are delivered to a customer in a self-service, subscription-based, elastically scalable, reliable, highly available, and secure manner.

A computer infrastructure system may provide many capabilities including, but not limited to, allocating resources for provisioning cloud services, provisioning, managing and tracking a customer's subscription for services and resources in the computer infrastructure system, providing predictable operating expenses to customers utilizing the services in the computer infrastructure system, providing robust identity domain separation and protection of a customer's data in the computer infrastructure system, providing customers with a transparent architecture and control of the design of the computer infrastructure system, providing customers assured data protection and compliance with data privacy standards and regulations, providing customers with an integrated development experience for building and deploying services in the computer infrastructure system and providing customers with a seamless integration between business software, middleware, database and infrastructure services in the computer infrastructure system.

In certain embodiments, services provided by the computer infrastructure system may include a host of services that are made available to users of the computer infrastructure system on demand such as online data storage and backup solutions, Web-based e-mail services, hosted office suites and document collaboration services, database processing, managed technical support services and the like. Services provided by the computer infrastructure system can dynamically scale to meet the needs of its users. A specific instantiation of a service provided by computer infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

In certain embodiments, providing a service in a computer infrastructure can include allocating resources to provision the service (e.g., deploy the service) in a cloud network. Allocating resources to a service can involve identifying a set of resources associated with a server rack, and reserving a subset of the set of resources specifically for the service. For example, allocating resources to a service can include determining a number of virtual machines that are needed to run the service, and executing a placement algorithm to determine which servers of a server rack to reserve for the virtual machines. As a further example, executing the placement algorithm may include reserving a certain amount of memory from the total memory available to a server rack and/or reserving a number of virtual CPU's (vCPU) or CPU's from a total number of vCPU's or CPU's available to the server rack. In certain embodiments, each of the servers that are included in a server rack are configured to run a particular service (or a small set of services).

FIG. 1A is a logical view of a computer infrastructure system 100 according to one embodiment. The computer infrastructure system 100 may be implemented as a cloud-based infrastructure system (e.g., a cloud infrastructure system) or an enterprise-based infrastructure system (e.g., an enterprise infrastructure system). For purposes of illustration, computer infrastructure system 100 is described in this disclosure according to some embodiments as a cloud infrastructure system. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by ORACLE CORPORATION) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 111 (e.g., Fusion CRM services provided by the Oracle cloud), Human Capital Management (HCM)/Talent Management services 112, and the like. CRM services 111 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present disclosure. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computer resources such as storage, networks, and other fundamental computer resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 1B:
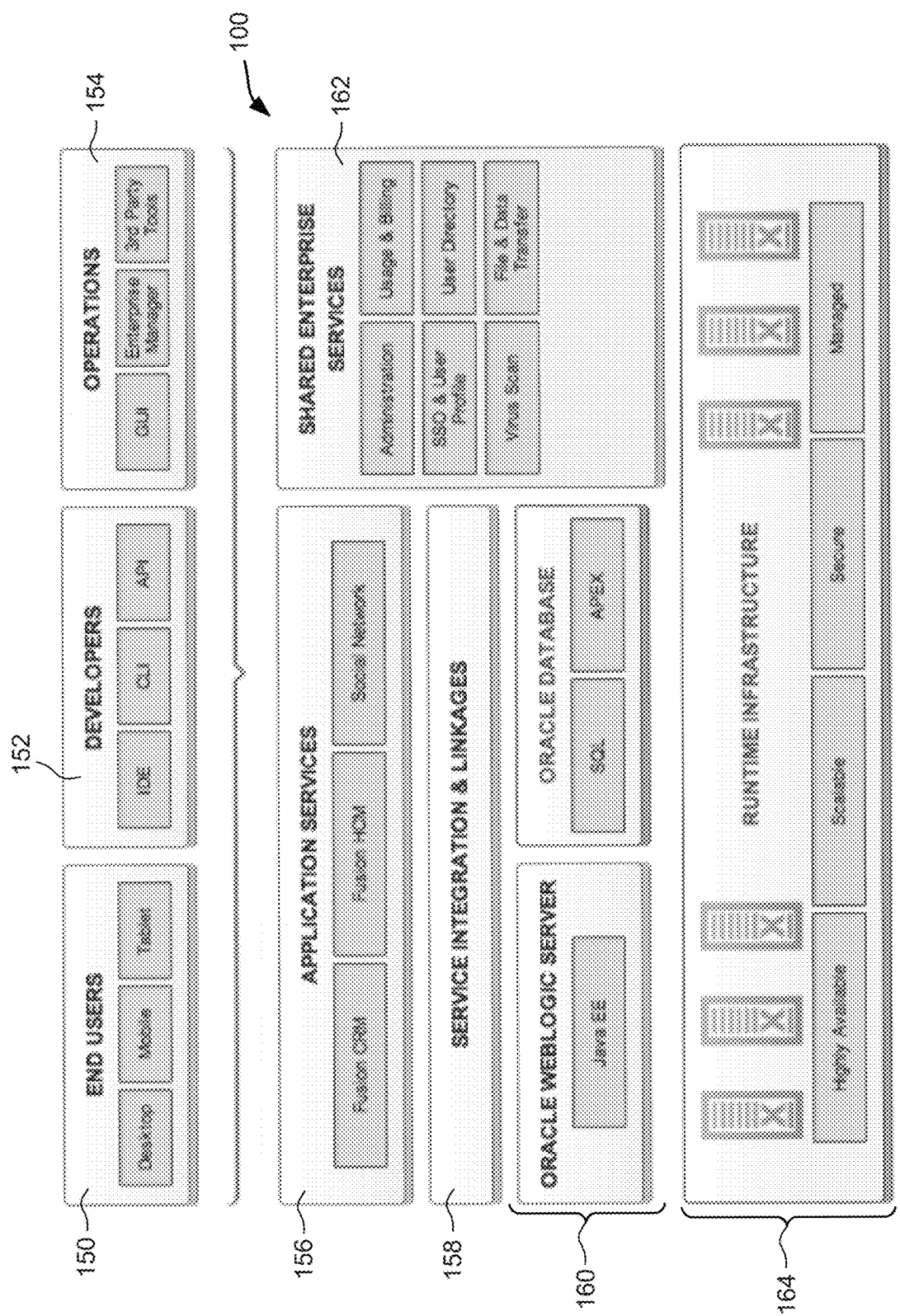
FIG. 1B is a simplified module diagram of a hardware/software stack that may be used to implement a cloud infrastructure system according to an embodiment.

FIG. 1B is a simplified module diagram of a hardware/ software stack that may be used to implement cloud infrastructure system 100 according to an embodiment of the present disclosure. It should be appreciated that implementation depicted in FIG. 1B may have other components than those depicted in FIG. 1B. Further, the embodiment shown in FIG. 1B is only one example of a cloud infrastructure system that may incorporate an embodiment of the present disclosure. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

In some embodiments, the cloud services described above may be offered as services via a cloud environment.

Figure 2:
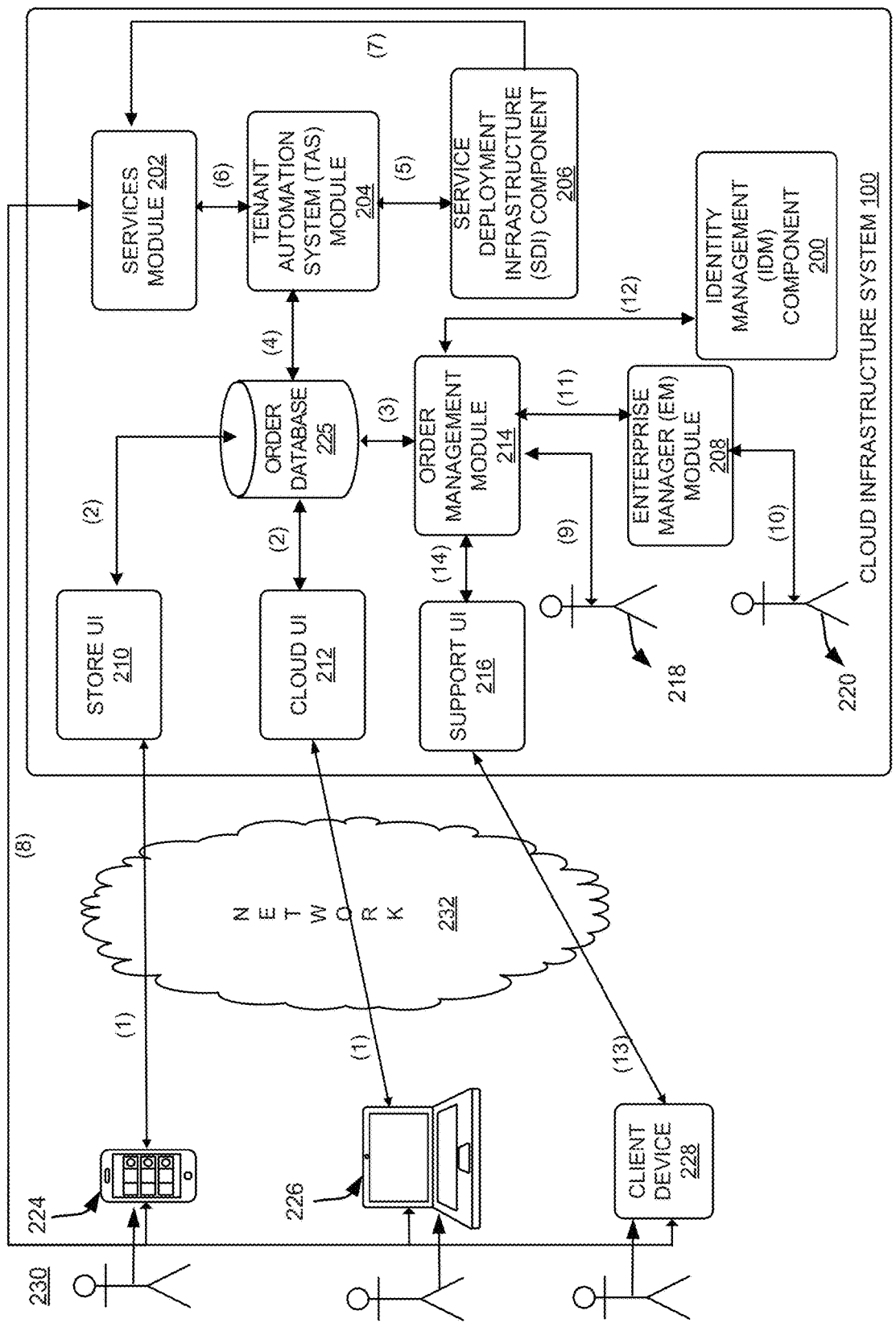
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present disclosure. In the illustrated embodiment, system environment 230 includes one or more client computer devices 224, 226 and 228 that may be operated by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the present disclosure. In some other embodiments, cloud infrastructure system 100 may have more or fewer components than shown in FIG. 2, may combine two or more components, or may have a different configuration or arrangement of components.

Client computer devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/ Linux operating systems), or any other computer device. For example, client computer devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computer devices, any number of client computer devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computer devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 225. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present disclosure. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include an order for a single service or multiple orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computer resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 225, which can be one of several databases operated by cloud infrastructure system 100 and utilized in conjunction with other system elements. While order database 225 is shown logically as a single database in FIG. 2, in actual implementation, this may comprise one or more databases.

At (3), the order is forwarded to order management module 214. Order management module 214 is configured to perform billing and accounting operations related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS system 204. In one embodiment, TAS system 204 utilizes the order information to orchestrate the provisioning of services and resources for the order placed by the customer. At (5), TAS system 204 orchestrates the provisioning of resources to support the subscribed services using the services of SDI instance 206. At (6) TAS system 204 provides information related to the provisioned order received from SDI instance 206 to services module 202. In some embodiments, at (7), SDI instance 206 may also use services provided by services module 202 to allocate and configure the resources needed to fulfill the customer's subscription order.

In certain embodiments, SDI instance 206 can intelligently allocate resources to support the subscribed services. For example, as described in greater detail in the disclosure below, SDI instance 206 can model existing resource assignments for other users who subscribed to the service to determine the best-fit servers of a rack to fit the virtual machines of the instant service request. Additionally, SDI instance 206 can learn the various configurations of resources that are allocated to support a given service over time, and make adjustments as needed. Advantageously, SDI instance 206 can optimize allocation of resources to services by minimizing the unused resources in a given server rack. SDI instance 206, using the techniques described below, can "fit" more virtual machines on server racks using the models at runtime.

At (8), services module 202 sends a notification to the customers on client devices 224, 226 and 228 regarding the status of the order. For example, the notification can include a web address that directs the user to the provisioned service that the user requested in the original order.

In certain embodiments, TAS system 204 operations as an orchestration component that manages business processes associated with each order and applies business logic to determine whether an order should proceed to provisioning. In one embodiment, upon receiving an order for a new subscription, TAS system 204 sends a request to SDI instance 206 to allocate resources and configure those resources needed to fulfill the subscription order. SDI instance 206 enables the allocation of resources for the services ordered by the customer using the enhanced allocation techniques described in great detail below. SDI instance 206 provides a level of abstraction between the cloud services provided by cloud infrastructure system 100 and the physical implementation layer that is used to provision the resources for providing the requested services. TAS system 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related operations such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
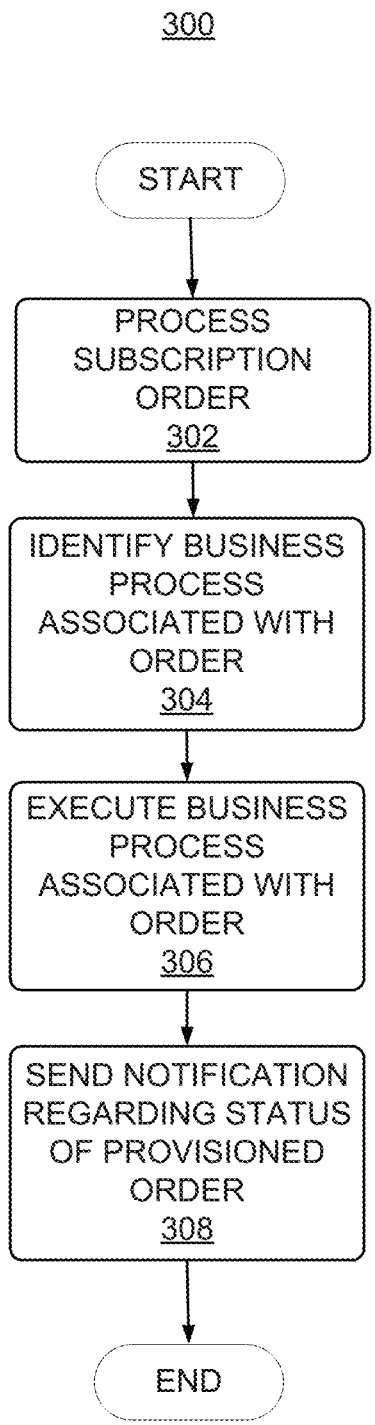
FIG. 3A depicts a simplified flowchart 300 depicting processing that may be performed by the TAS system in the cloud infrastructure system, in accordance with an embodiment.

FIG. 3A depicts a simplified flowchart 300 depicting processing that may be performed by the TAS system in the cloud infrastructure system, in accordance with an embodiment of the present disclosure. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present disclosure may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS system 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office operations such as creating a customer record for the user, performing accounting operations related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI instance 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
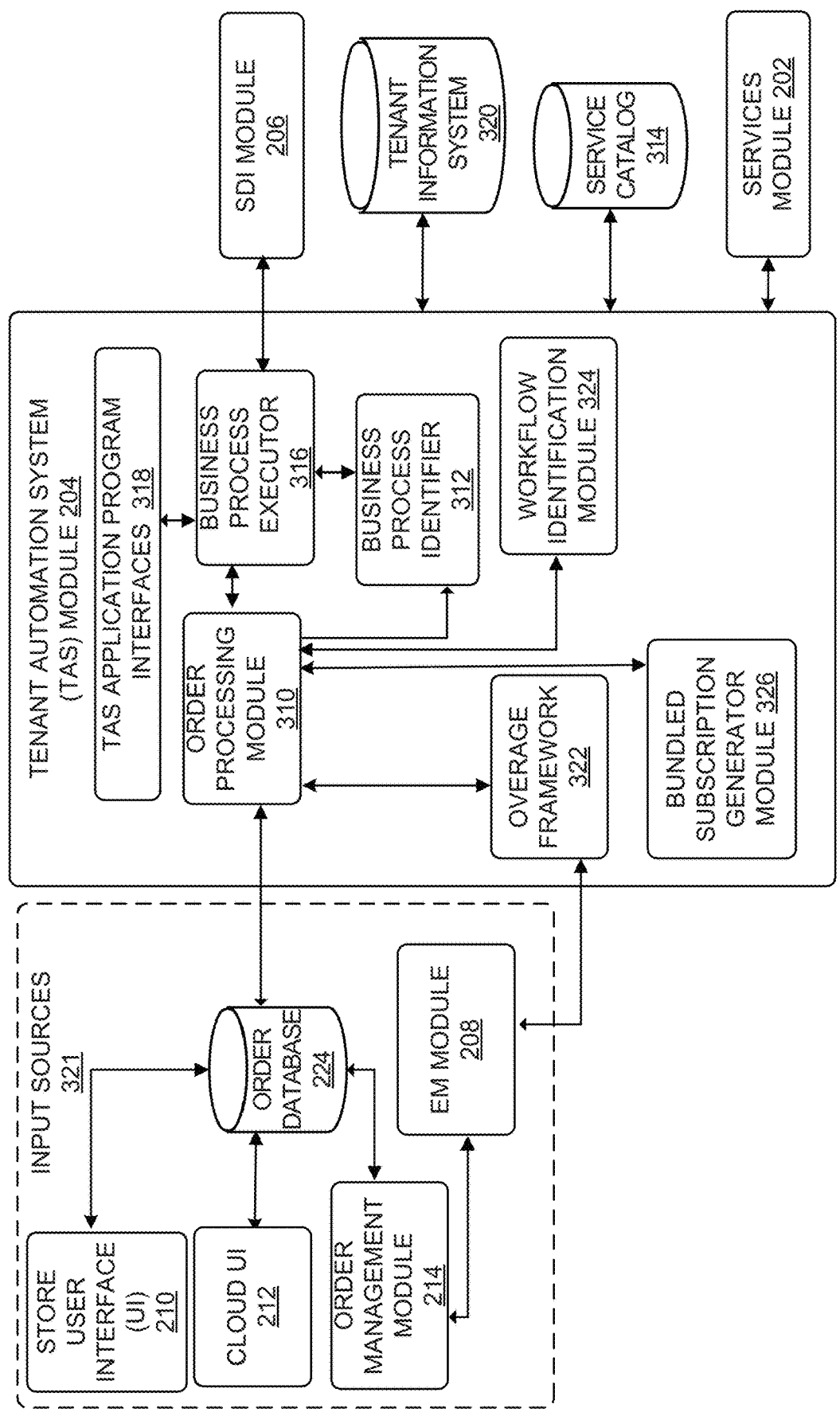
FIG. 3B depicts a simplified high level diagram of one or more sub-modules in the TAS system in the cloud infrastructure system, in accordance with an embodiment.

FIG. 3B depicts a simplified high level diagram of one or more sub-modules in the TAS system in the cloud infrastructure system, in accordance with an embodiment of the present disclosure. In one embodiment, the modules depicted in FIG. 3B perform the processing described in steps 302-308 discussed in FIG. 3A. In the illustrated embodiment, TAS system 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS system depicted in FIG. 3B are meant for illustrative purposes only and are not intended to limit the scope of embodiments of the present disclosure. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 225. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS system 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI instance 206 to execute steps for intelligently allocating and provisioning resources for services requested in the subscription order. In this example, for each step in the business process, business process executor 316 may send a request to SDI instance 206 to allocate resources and configure resources needed to fulfill the particular step. SDI instance 206 is responsible for the actual allocation of the resources. As described below, for example, SDI instance 206 can fit a set of virtual machines to the unreserved memory and unreserved vCPU's available to a server rack in a manner that minimizes the unused resources. Once all the steps of the business processes of an order have been executed, business process executor 316 may send a notification to the customer of the processed order by utilizing the services of services module 202. The notification may include sending an email notification to the customer with details of the processed order. The email notification may also include deployment information related to the order to enable the customer to access the subscribed services.

In certain embodiments, TAS system 204 may provide one or more TAS Application Programming Interfaces (APIs) 318 that enable TAS system 204 to interact with other modules in cloud infrastructure system 100 and for other modules to interact with TAS system 204. For example, the TAS APIs may include a system provisioning API that interacts with SDI instance 206 via an asynchronous Simple Object Access Protocol (SOAP) based web services call to provision resources for the customer's subscription order. In one embodiment, TAS system 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS system 204 also periodically propagates subscription information, outages, and notifications (e.g. planned downtime) to services module 202.

In certain embodiments, TAS system 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS system 204 includes an order workflow identification module 324 that is configured to identify one or more workflows associated with processing a customer's subscription order. In certain embodiments, TAS system 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS system 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS system 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
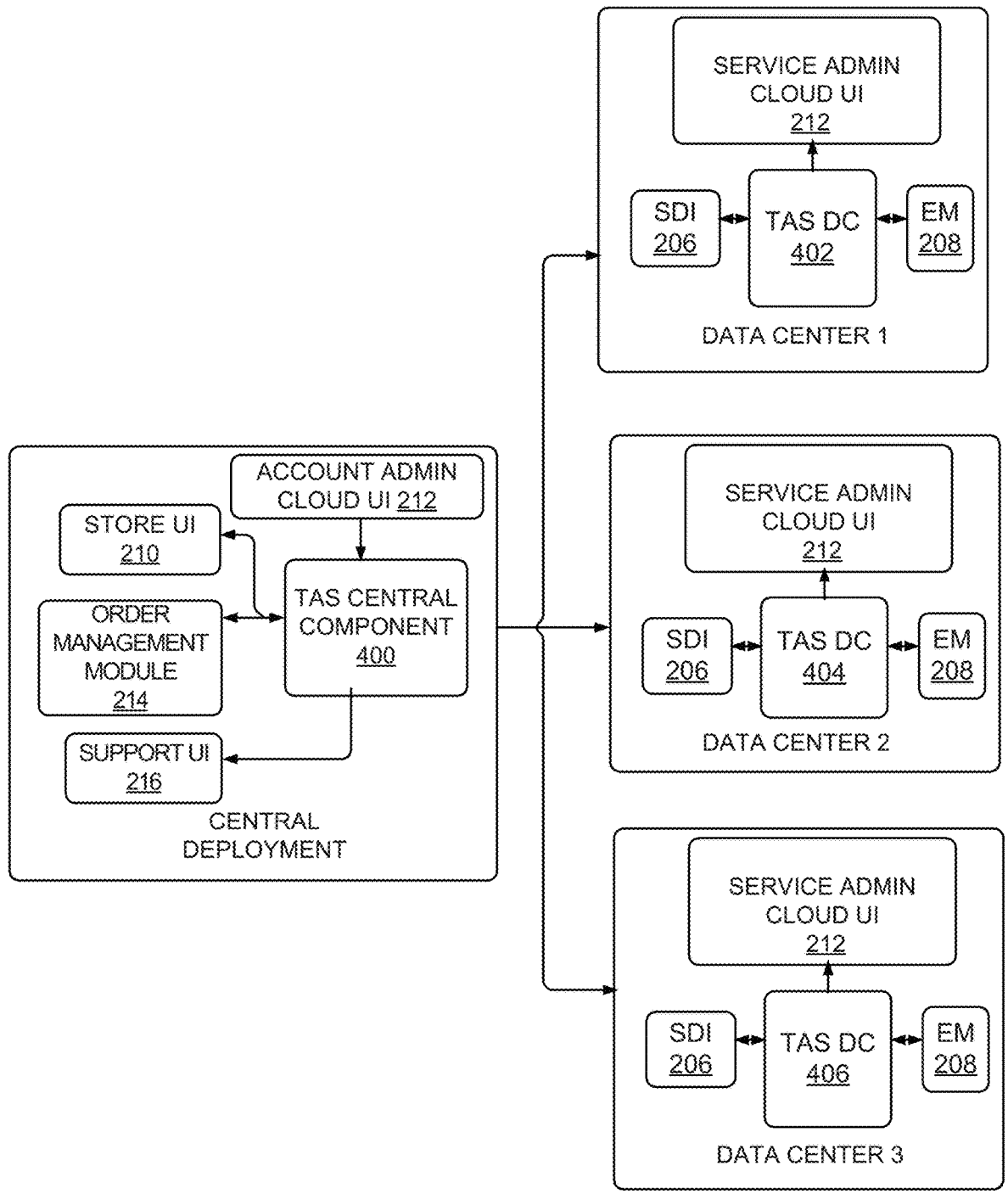
FIG. 4 depicts an exemplary distributed deployment of the TAS component, according to an embodiment.

FIG. 4 depicts an exemplary distributed deployment of the TAS system, according to an embodiment of the present disclosure. In the embodiment depicted in FIG. 4, the distributed deployment of TAS system 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management module 214, or via order database 225. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI instance 206 to orchestrate the provisioning of physical resources for the order. SDI instance 206 in respective TAS DCs 402, 404 or 406 allocates resources and configures those resources needed to fulfill the subscription order.

In certain embodiments, TAS DCs, 402, 404 or 406 identify an identity domain associated with the subscription. SDI instance 206 may provide the identity domain information to IDM module 200 (shown in FIG. 2) for identifying an existing identity domain or creating a new identity domain. Once the order is provisioned by the SDI instance at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management module 214.

Figure 5:
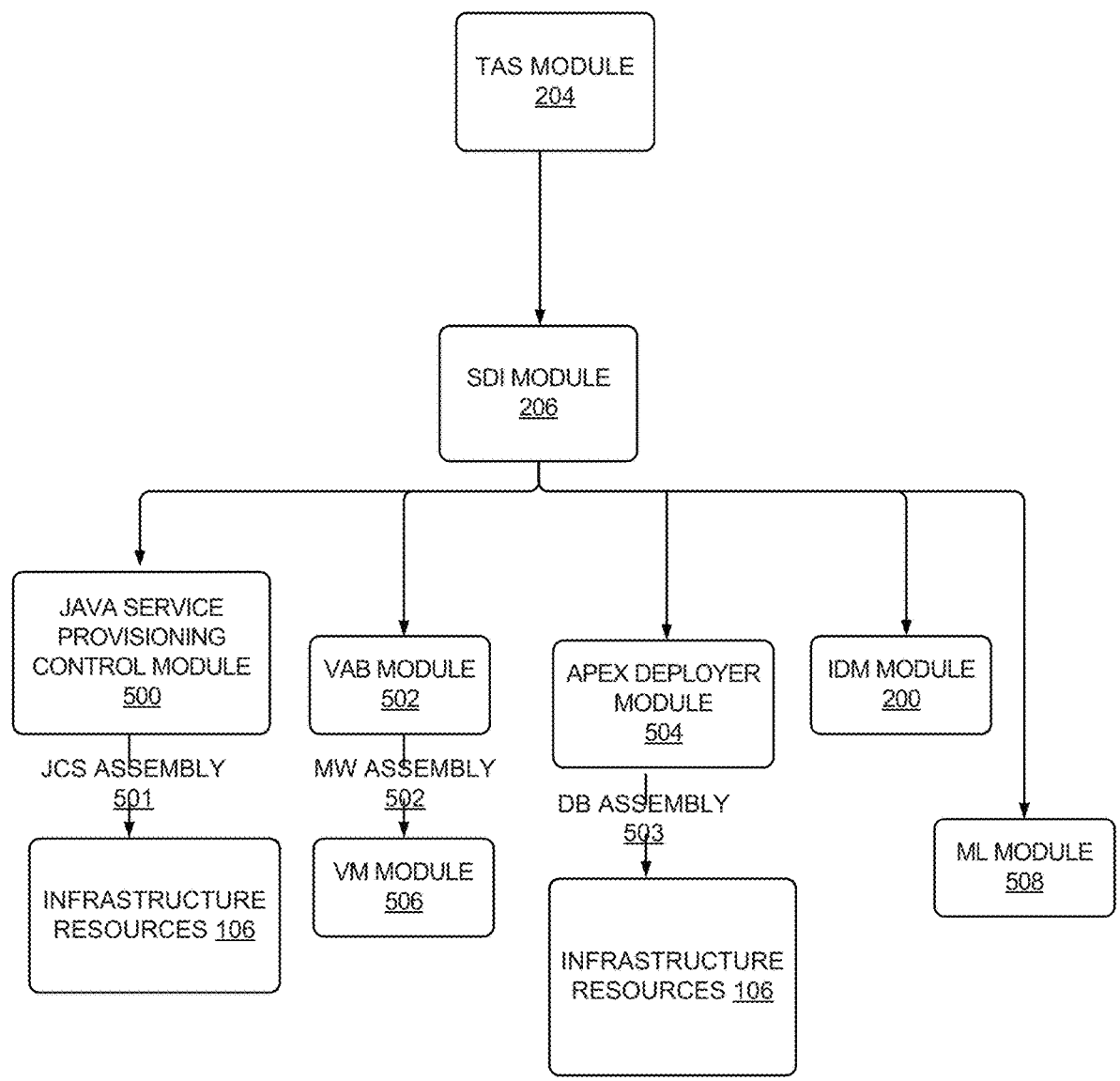
FIG. 5 is a simplified block diagram illustrating the interactions of the SDI instance with one or more modules in the cloud infrastructure system, in accordance with an embodiment.

FIG. 5 is a simplified block diagram illustrating the interactions of SDI instance 206 with one or more modules in the cloud infrastructure system, in accordance with an embodiment of the present disclosure. In certain embodiments, SDI instance 206 interacts with TAS system 204 to intelligently provision resources for services in a subscription order received by TAS system 204. In certain embodiments, one or more of the modules illustrated in FIG. 5 may be modules within cloud infrastructure system 100. In other embodiments, one or more of the modules that interact with SDI instance 206 may be outside cloud infrastructure system 100. In addition, alternative embodiments may have more or less modules than those shown in FIG. 5. These modules may be implemented in hardware, or software, or combinations thereof.

In one embodiment, the modules in SDI instance 206 may include one or more modules in SaaS platform 102 and PaaS platform 104 in cloud infrastructure system 100. In order to perform provisioning of resources for various services, SDI instance 206 may interact with various other modules, each customized to help with provisioning resources for a particular type of service. For example, as illustrated in FIG. 5, SDI instance 206 may interact with a Java service provisioning control module 500 to provision Java cloud services. In one embodiment, Java service provisioning control component 500 may deploy a Java Cloud Service (JCS) assembly specified by SDI instance 206 that includes a set of tasks to be performed to provision Java cloud services. Infrastructure resources 106 then determines the resources needed to provision the Java cloud services.

As other examples, SDI instance 206 may interact with one or more modules such as a Virtual Assembly Builder (VAB) module 502, an Application Express (APEX) deployer module 504, a Virtual Machine (VM) module 506, machine-learning (ML) module 508, an IDM module 200, and a database machine module 118. VAB module 502 includes capabilities to configure and provision complete multi-tier application environments. In certain embodiments, VAB module 502 deploys a Middleware (MW) service assembly specified by SDI instance 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI instance 206 to provision a database service in cloud infrastructure system 100 using the resources provided by infrastructure resources 106. SDI instance 206 interacts with IDM module 200 to provide identity services such as access management across multiple applications in cloud infrastructure system 100.

In certain instances, SDI instance 206 may interact with ML module 508 to execute one or more machine-learning algorithms to learn the expected size (e.g., amount of memory and/or number of vCPU's) of virtual machines that SDI instance 206 is most likely going to be provisioning in the future for a given server or cloud application. For example, ML module 508 can identify the service requested by the user from the request, identify historical provision data of the users that have ordered that particular service in the past, and generate and/or access one or more models that represent a distribution of sizes of virtual machines included the historical provision data. Then, at runtime, SDI instance 206 can identify the number of virtual machines needed to support the requested service, and use the one or more models in executing a placement protocol that optimizes the fitting of virtual machines to servers of a server rack by minimizing unused resources. Advantageously, SDI instance 206 can reduce hardware costs and processing load by evaluating the one or more models to fit the virtual machines needed to support the requested service into servers of a server rack in a way that minimizes the unused resources. For example, minimizing unused resources in multiple dimensions may include minimizing unused memory and minimizing unused vCPUs) after fitting the virtual machines into servers. Enhancing resource allocation, using techniques described herein, provides the technical benefit of balancing resource usage in multiple dimensions on racks, thereby reducing the number of racks needed to support various services because the existing racks are optimized in their allocation of resources.

Figure 6:
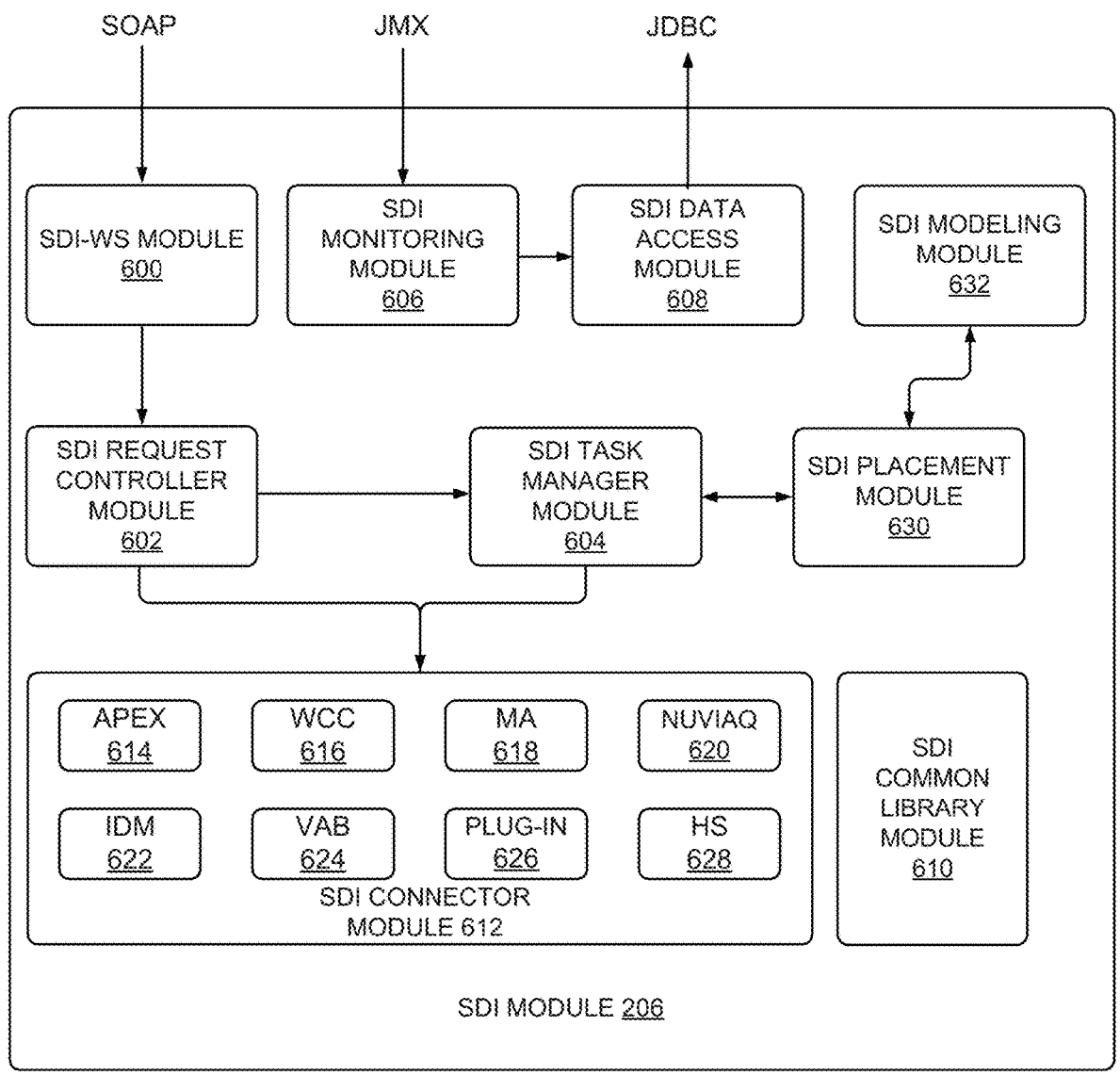
FIG. 6 depicts a simplified high level diagram of sub-modules of the SDI instance according to an embodiment.

FIG. 6 depicts a simplified high level diagram of submodules of the SDI instance according to an embodiment of the present disclosure. In the embodiment depicted in FIG. 6, SDI instance 206 includes a SDI-Web Services (WS) module 600, an SDI request controller module 602, an SDI task manager module 604, an SDI monitoring module 606, an SDI data access module 608, an SDI common library module 610, an SDI connector module 612, SDI placement module 630, and SDI modeling module 632. These modules may be implemented in hardware, or software, or combinations thereof. SDI instance 206 depicted in FIG. 6 and its various modules are meant for illustrative purposes only and are not intended to limit the scope of embodiments of the present disclosure. Alternative embodiments may have more or less modules than those shown in FIG. 6. Alternative embodiments may also have different connections than those shown in FIG. 6. These modules and their operations are described in detail below.

SDI-WS module 600 includes capabilities for receiving a step in the business associated with an order from business process executor 316 of TAS system 204. In one embodiment, SDI-WS module 600 parses each step of the business process and converts the step into an internal representation used by SDI instance 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI instance 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS system 204 with operation results that may include an order payload with details of the resources provisioned to fulfill the particular step. SDI task manager module 604 repeats this process until all the steps of the particular business process associated with the order are complete.

In certain embodiments, SDI task manager 604 translates one or more tasks that determine how many virtual machines are needed to support the requested service. For example, if a user requested a SaaS service, one or more of the tasks that SDI task manager 604 translates is to determine how many virtual machines would be needed to support the version of the SaaS service requested. In some cases, one or more of the tasks that SDI task manager 605 translates is to determine which, if any, add-on options the user requested to be associated with the requested service. The add-on options requested for the service can alter the resource requirements in a deterministic way. For example, a particular add-on option requested for the service may increase the number of virtual machines needed to provision the service. As another example, an add-on option may increase the number of vCPU's that are needed to provision the requested service. As a further example, an add-on option may increase a size (e.g., a memory needed) for a particular virtual machine. In some cases, the add-on options available for the user to select from may be dependent on a particular configuration of the service requested by the user.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI instance 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI instance 206.

SDI modeling module 632 can execute one or more machine-learning algorithms (e.g., a genetic machine-learning technique) to model historical provision data of the requested service. For example, the historical provision data of the requested service can represent all or a subset of all of the previously provisioned services for the requested service. As a non-limiting example, if a user requests a SaaS service (e.g., a Fusion CRM service provided by the ORACLE cloud), SDI modeling module 632 can access historical provision data of all or a subset of all previous instances in which the particular SaaS service was requested by users. For example, SDI modeling module 632 may filter the historical provision data for all previous provisioning instances over the last period of time (e.g., a year, two years, 5 years, etc.). In certain embodiments, the historical provision data may include a size of virtual machines previously used to deploy the requested server. Further, as an example, the historical provision data can include data representing that the smallest virtual machine used for the requested service is typically 20 GB. As another example, the historical provision data can include data representing that there are three possible configurations of sizes and/or number of virtual machines used to deploy the requested service, based on previously provisioned instances of the requested service.

By evaluating the historical provision data, SDI modeling module 632 can extract or deduce a set of possible configurations of resource allocations that may be ordered by users. In certain embodiments, the set of possible configurations of resource allocations may represent a distribution of different sizes of virtual machines or different number of virtual machines previously provisioned for the requested service. For example, SDI modeling module 632 can generate a statistical model that represents that there is a distribution of three different configurations of resource allocations of the requested service that have been previously provisioned for other users. As a further example, if the requested service enables users to select from five different add-on options, SDI modeling module 632 can generate a model that represents a distribution of selected add-on options and the corresponding resource allocations. For instance, assuming there are five add-on options, SDI modeling module 632 can model the historical provision data associated with the requested service to identify that the probability of the first add-on being selected is 10 percent, the probability of the second add-on being selected is 5 percent, the probability of the third add-on being selected is 90 percent, the probability of the fourth add-on being selected is 50 percent, and the probability of the fifth add-on being selected is 20 percent. Each service may correspond to a different model than the model(s) of other services.

SDI placement module 630 can access the models generated by SDI modeling module 632 to select a server from amongst a plurality of servers of a rack, such that the selected server would be the best-fit for the virtual machines needed to provision the requested service. In certain embodiments, SDI placement module 630 executes a placement protocol or algorithm for a specific rack to determine whether to map the virtual machines to a server of the rack or whether a failure occurred. The placement protocol may take in as input (1) the number of virtual machines that are currently running on the rack, (2) the remaining (e.g., unused) resources (e.g., unused memory, unused vCPU's or CPU's) for each server on the rack, (3) the number of virtual machines required to support the requested service, and (4) the resources needed for the virtual machines required to support the requested service (e.g., the memory and number of vCPU's needed to spin up the virtual machines on the rack). In certain embodiments, the output of the placement algorithm may be a failure notification, which indicates that the virtual machines requested to be placed on the rack do not fit on the rack. For example, not fitting on a rack may indicate that the unused resources available to the rack (e.g., 10 GB remaining unused) are not sufficient to map to the size of the virtual machines needed to provide the requested service (e.g., 15 GB is needed to provision the service). In certain embodiments, the output of the placement protocol may be a success notification, which indicates that the virtual machines needed to support the requested service will be mapped to the one or more servers of the rack.

Figure 7:
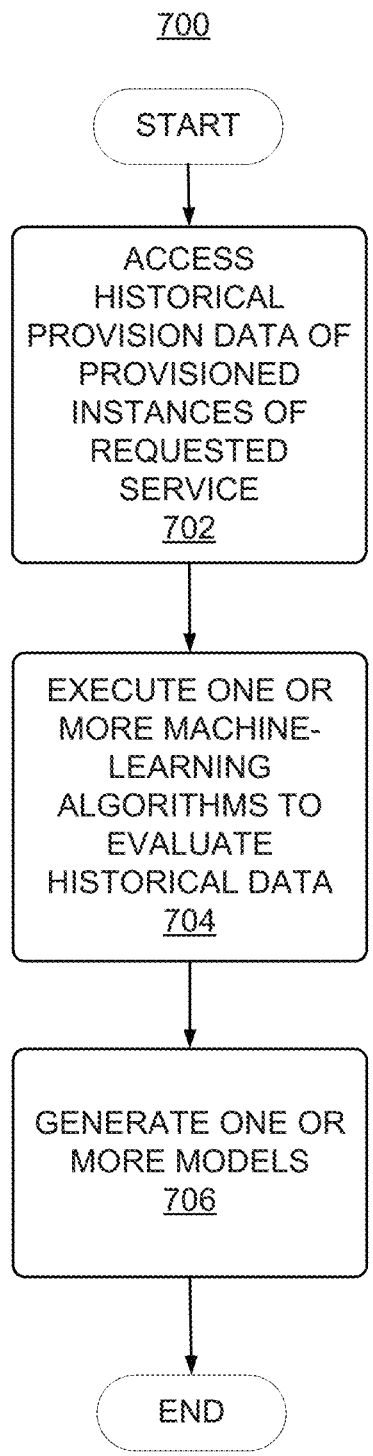
FIG. 7 depicts a simplified flowchart depicting processing that may be performed by an SDI component in the cloud infrastructure system, in accordance with an embodiment.

The embodiment of FIG. 6 discussed above describes modules in the SDI instance according to an embodiment of the present disclosure. FIG. 7 depicts a simplified flowchart 700 depicting processing that may be performed by the modules of the SDI instance in the cloud infrastructure system, in accordance with an embodiment of the present disclosure. The processing depicted in FIG. 7 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7 is not intended to be limiting. Other sequences of steps may also be performed according to alternative embodiments. For example, alternative embodiments of the present disclosure may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7 may be performed by one or more modules in the SDI instance 206 discussed in detail in FIG. 6.

At 702, historical provision data (e.g., historical data) of previously-provisioned instances of the requested service is accessed. In certain embodiments, SDI modeling module 632 in SDI instance 206 may access the historical data from one or more data sources (e.g., a database that stores the historical data of previously-provisioned instances). For example, the historical data may include the number of virtual machines and their corresponding sizes (e.g., size of memory reserved, number of vCPU's, etc.) used to provide the requested service for all or some previously-provisioned instances of the requested service. The historical data can be evaluated to deduce the possible configurations of the virtual machines and their corresponding sizes to provide the requested service. At 704, one or more machine-learning algorithms can be executed to evaluate the historical data. In certain embodiments, SDI modeling module 632 in SDI instance 206 may execute or perform a genetic machine-learning algorithm on the historical data. At 706, one or more models can be generated based on the machine-learning algorithms executed at 704. For example, the model can be an array of numbers that are fed into SDI modeling module 632 or SDI placement module 630, such that each number in the array is a "fit" score representing a particular amount of resource remaining. In certain embodiments, the "fit" score may include a series of "bins," such that each bin denotes a different "fit" score, and the "fit" score represents how well a virtual machine fits into a server of a rack. For example, a bin corresponding to 0-1 GB remaining (e.g., unused in a server of the rack) may be assigned a high score (e.g., representing a good fit), a bin corresponding to 1-2 GB remaining (e.g., unused in a server of the rack) may be assigned a lower score (e.g., representing a medium fit), and a bin corresponding to 19-20 GB remaining (e.g., unused in a server of a rack) may be assigned a high negative score (e.g., representing a poor fit between the virtual machine and the server), and so on. In certain embodiments, the values of these bins, the granularity of the bins (e.g., a range of unused memory), and a quantity of bins may each be machine learned and modified as data changes in the historical data. For example, a rack servicing a different service may have much larger or smaller virtual machines that are needed to provide the service, so the granularity of the bins for a rack associated with that service can be variable. Further, the quantity of bins may also be variable, especially in cases where there is a larger variety of virtual machine sizes.

It will be appreciated that a score may have one or more components, including the "fit" score. For example, in addition to or in lieu of the "fit" score, a "fill" score may be calculated. The "fill" score may indicate a degree to which a server is preferred. A server may be preferred if the resources of the server are entirely unreserved, or in some cases, a server may be preferred of the resources of the server are partially reserved and partially unreserved by other virtual machines. In addition, the score may include a "balance" score component. For example, the balance score penalizes heavily utilizing an unbalanced usage of resources. For example, the balance score may represent a penalty that is negated if other servers have a similar usage distribution. In certain embodiments, the weights of search score component in the total score may be learned iteratively.

In certain embodiments, the placement protocol may be updated or adjusted after each iteration of the learning process. It will also be appreciated that, in certain embodiments, the iterative learning process may be performed using a genetic algorithm, which includes a population of weight vectors. For example, in each iteration of the learning process, the weight vectors are each put through the same incoming pod requests, and those that manage to utilize the rack more efficiently score higher or more favorably. Each weight vector is then scored based on how efficiently the weight vector managed to fill up the servers in a rack. The best vectors become the progenitors of the next generation, with a few exceptional ones also being cloned with no modification. In certain embodiments, progenitors may be randomly combined; each individual weight may either be one or the other parent's or it may be an average of the two. After the child vector has been formed, random mutations may be introduced.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 8:
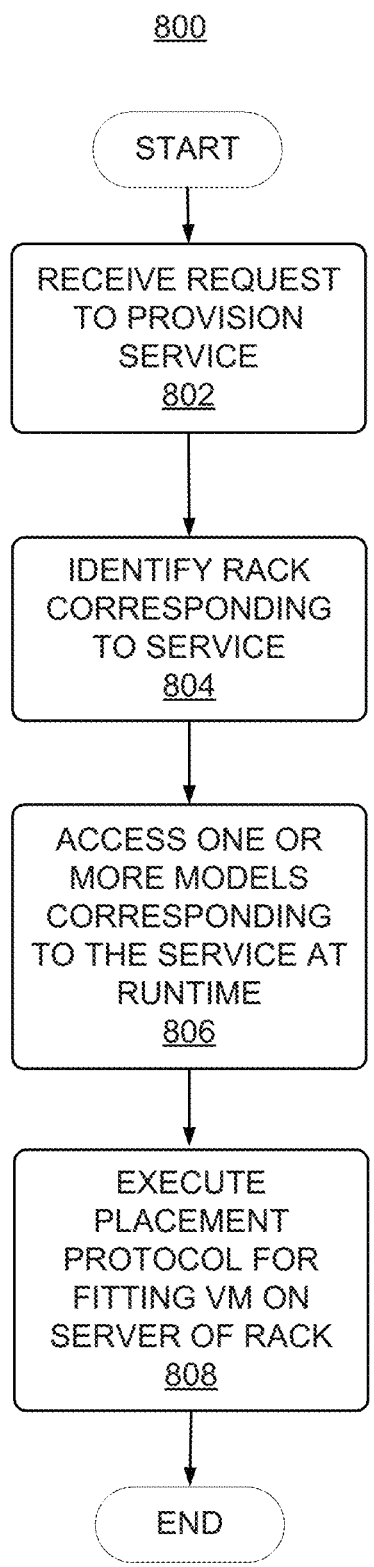
FIG. 8 depicts a simplified flowchart depicting processing that may be performed by an SDI component in the cloud infrastructure system, in accordance with another embodiment.

FIG. 8 depicts a simplified flowchart 800 depicting processing that may be performed by the modules of the SDI instance in the cloud infrastructure system, in accordance with an embodiment of the present disclosure. The processing depicted in FIG. 8 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 8 is not intended to be limiting. Other sequences of steps may also be performed according to alternative embodiments. For example, alternative embodiments of the present disclosure may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 8 may be performed by one or more modules in the SDI instance 206 discussed in detail in FIG. 6.

At 802, a request to provision a new instance of a service may be received. In certain embodiments, SDI-WS module 600 in SDI instance 206 may receive the request (or a version of the request after being processed to some extent). The request may be received from a client device operated by a user. For example, the client device can be connected to an enterprise network associated with an entity (e.g., a company). The user can operate the client device to request that the cloud infrastructure system provide a service to the entity or to the client device. An example response to the request (after the enhanced allocation of resources, described herein) may be a web address that corresponds to a network location at which the service is being provided to the entity and/or client device. As part of receiving the request, the SDI instance can identify the service requested and the size of the virtual machine(s) that would be needed to deploy the requested service. As a non-limiting example, deploying a SaaS application may require 10 virtual machines (which act together as a "pod"), which communicate with each other to provide the service. At 804, SDI instance 206 can access priority settings, which identify a priority or hierarchy of racks to investigate for placement of the virtual machines. For example, a rack with a priority setting of 100 may be identified and evaluated for placement of virtual machines before a rack with a priority setting of 90. If a rack is evaluated and a failure results after executing the placement protocol, SDI instance 206 may move on to the next rack based on the priority setting. Further, in certain embodiments, a rack may include servers that are configured to support a single service. The servers that are wired together and that constitute the rack are configured to support a single service (or in some cases a small set of service).

At 806, SDI modeling module 632 can access one or more models generated to enhance the allocation of resources for deploying services. In certain embodiments, the models can be accessed at runtime, but generated in advance outside of the placement protocol. Further, the models that are accessed correspond to the requested service. A particular service may have a corresponding model that models the possible configurations of virtual machines that are needed to provision the requested service. At 808, the placement protocol is executed to identify the best-fit placement of the virtual machines to servers on the rack identified at 804. In certain embodiments, the output of the placement algorithm may either be a failure notification (which indicates that the virtual machines do not fit on the servers of the rack) or a success notification (which indicates that the virtual machines fit and will be mapped to the servers of the rack).

In certain embodiments, as part of the placement algorithm, virtual machines are placed one at a time by scoring all of the servers in a rack for that particular virtual machine. The server that is ultimately chosen for placement of a virtual machine may be the server with the highest score (e.g., having a score above a threshold) using the scoring techniques described above. In certain embodiments, all of the virtual machines that need placement in order to deploy the service are placed independently and sequentially, starting with the largest virtual machine (e.g., the virtual machine with the largest memory or number of vCPU's). The scores indicate how well the virtual machine "fits" into the server. When the server corresponds to a favorable score, the server fits the virtual machine well. Fitting a virtual machine into a server includes identifying the total amount of memory available to the server that has not been reserved, and allocating at least a portion of the total amount of memory available to the virtual machine. The portion of the total amount of memory allocated to the machine may be the amount of memory needed to spin up the virtual machine.

Figure 9:
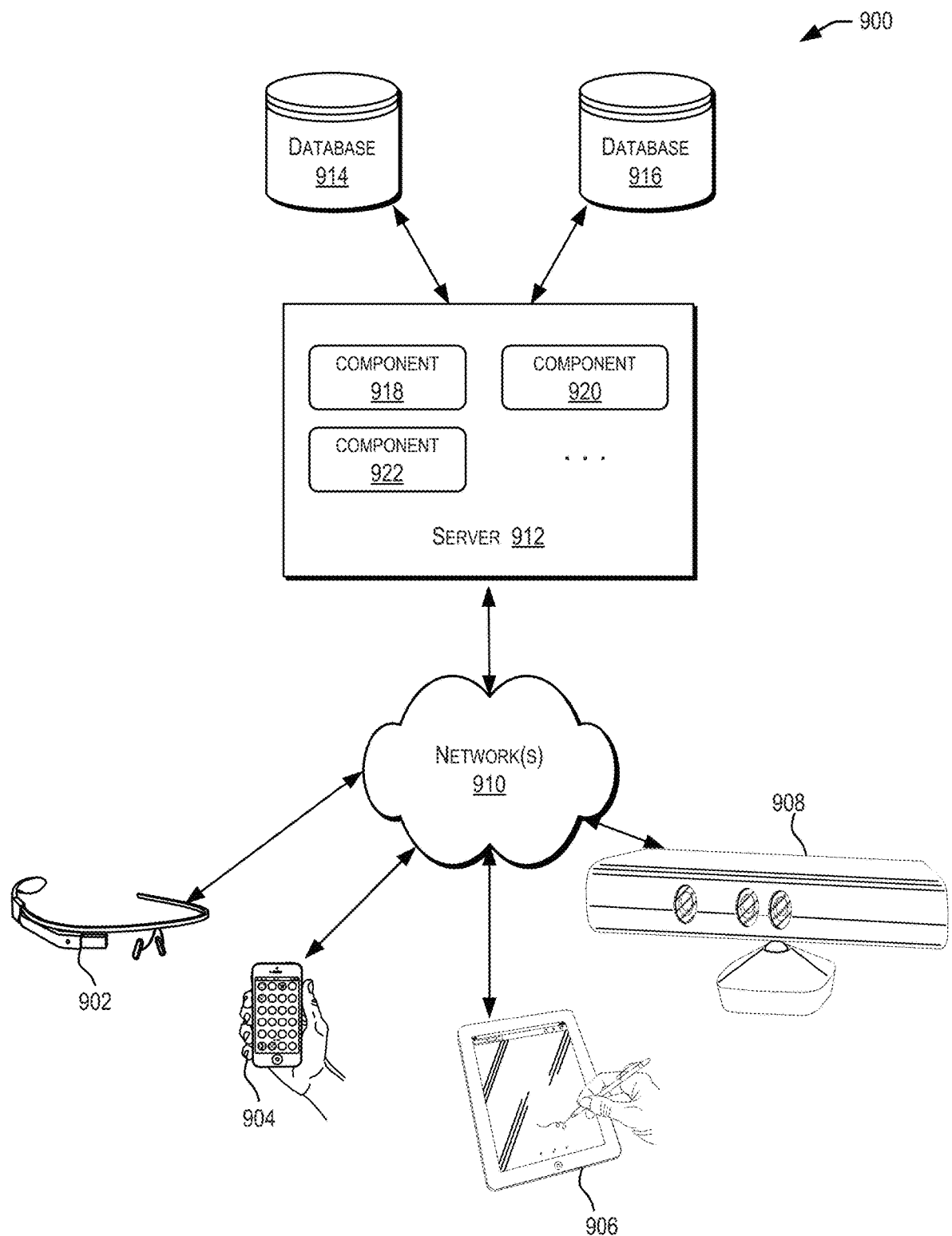
FIG. 9 depicts a simplified diagram of a distributed system for implementing an embodiment of the present disclosure.
Figure 10:
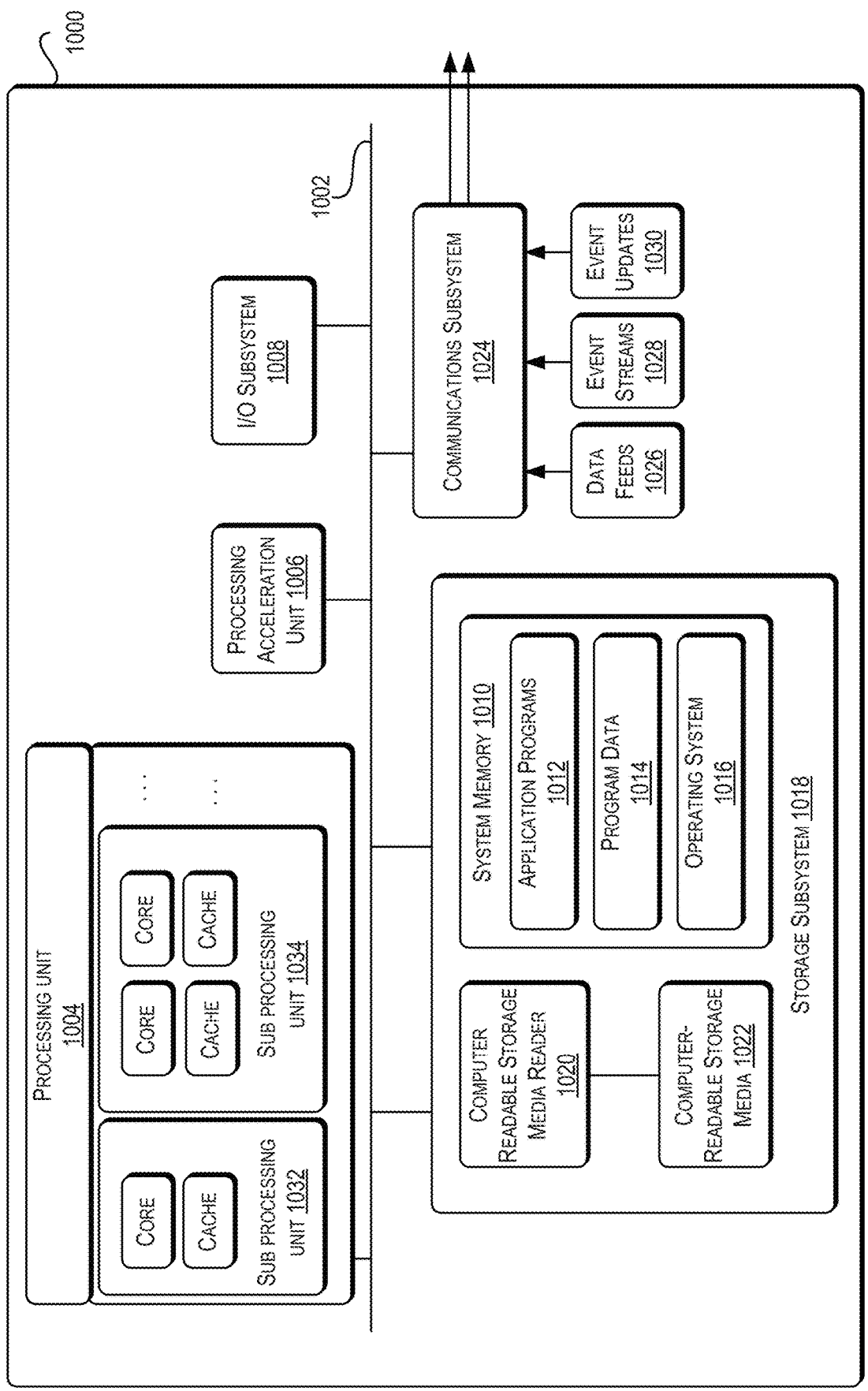
FIG. 10 illustrates an exemplary computer system that may be used to implement an embodiment.

FIGS. 9 and 10 illustrate aspects of example environments for implementing aspects of the present disclosure in accordance with various embodiments. FIG. 9 depicts a simplified diagram of a distributed system 900 for implementing an embodiment of the present disclosure. In the illustrated embodiment, the distributed system 900 includes one or more client computer devices 902, 904, 906, and 908, which are configured to execute and operate a client application such as a web browser, proprietary client (e.g., Oracle Forms), or the like over one or more network(s) 910. The server 912 may be communicatively coupled with the remote client computer devices 902, 904, 906, and 908 via network 910.

In various embodiments, the server 912 may be adapted to run one or more services or software applications such as services and applications that provide identity management services. In certain embodiments, the server 912 may also provide other services or software applications can include non-virtual and virtual environments. In some embodiments, these services may be offered as web-based or cloud services or under a Software as a Service (SaaS) model to the users of the client computer devices 902, 904, 906, and/or 908. Users operating the client computer devices 902, 904, 906, and/or 908 may in turn utilize one or more client applications to interact with the server 912 to utilize the services provided by these components.

In the configuration depicted in FIG. 9, the software components 918, 920 and 922 of system 900 are shown as being implemented on the server 912. In other embodiments, one or more of the components of the system 900 and/or the services provided by these components may also be implemented by one or more of the client computer devices 902, 904, 906, and/or 908. Users operating the client computer devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

The client computer devices 902, 904, 906, and/or 908 may include various types of computer systems. For example, client device may include portable handheld devices (e.g., an iPhone®, cellular telephone, an iPad®, computer tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computer devices may also include general purpose personal computers including, by way of example, personal computers and/or laptop computers running various versions of Microsoft Windows®, Apple Macintosh®, and/or Linux operating systems. The client computer devices can be workstation computers running any of a variety of commercially-available UNIX® or UNIX-like operating systems, including without limitation the variety of GNU/Linux operating systems, such as for example, Google Chrome OS. Client computer devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 910.

Although distributed system 900 in FIG. 9 is shown with four client computer devices, any number of client computer devices may be supported. Other devices, such as devices with sensors, etc., may interact with the server 912.

The network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computer architectures involving virtualization. One or more flexible pools of logical storage devices can be virtualized to maintain virtual storage devices for the server. Virtual networks can be controlled by the server 912 using software defined networking. In various embodiments, the server 912 may be adapted to run one or more services or software applications described in the foregoing disclosure. For example, the server 912 may correspond to a server for performing processing as described above according to an embodiment of the present disclosure.

The server 912 may run an operating system including any of those discussed above, as well as any commercially available server operating system. Server 109 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 912 may include one or more applications to analyze and consolidate data feeds and/or event updates received from users of the client computer devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. The server 912 may also include one or more applications to display the data feeds and/or real-time events via one or more display devices of the client computer devices 902, 904, 906, and 908.

The distributed system 900 may also include one or more databases 914 and 916. These databases may provide a mechanism for storing information such as user identity information, and other information used by embodiments of the present disclosure. Databases 914 and 916 may reside in a variety of locations. By way of example, one or more of databases 914 and 916 may reside on a non-transitory storage medium local to (and/or resident in) the server 912. Alternatively, the databases 914 and 916 may be remote from the server 912 and in communication with the server 912 via a network-based or dedicated connection. In one set of embodiments, the databases 914 and 916 may reside in a storage-area network (SAN). Similarly, any necessary files for performing the operations attributed to the server 912 may be stored locally on the server 912 and/or remotely, as appropriate. In one set of embodiments, the databases 914 and 916 may include relational databases, such as databases provided by Oracle, that are adapted to store, update, and retrieve data in response to SQL-formatted commands.

FIG. 10 illustrates an exemplary computer system 1000 that may be used to implement an embodiment of the present disclosure. In some embodiments, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1010 including potentially on one or more storage devices. Through suitable programming, processing subsystem 1004 can provide various functionalities described above for dynamically modifying documents (e.g., webpages) responsive to usage patterns.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, micro-phones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, the account management system 112 depicted in FIG. 1 may receive user login information including input related to a training word from client devices using communication subsystem 1024. Additionally, communication subsystem 1024 may be used to communicate notifications of successful logins or notifications to re-enter a password from the account management system 112 to the requesting users.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computer tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A non-transitory computer readable medium storing computer-executable instructions that, upon execution by one or more processors, cause the one or more processors to:
collect, by a computer infrastructure system, historical provision data for a plurality of racks, each rack of the plurality of racks being associated with one or more servers configured to provision a cloud application, the historical provision data representing one or more configurations of virtual machines previously used to provision at least one previous instance of the cloud application, and each configuration of the one or more configurations indicating a number of virtual machines used to provision a previous instance and a memory allocation of each virtual machine of the number of virtual machines used;
analyze the historical provision data using one or more machine-learning techniques;
generate, based at least in part on the analyzing, a model that represents a distribution across the one or more configurations of the number of virtual machines used and the memory allocation of each virtual machine of the number of virtual machines used;
receive a request for the computer infrastructure system to provision a new instance of the cloud application;
select a rack from the plurality of racks, the selected rack being configured to run the new instance of the cloud application, the selected rack corresponding to a set of servers, and each server of the set of servers being associated with a resource;
execute, at a runtime, a placement protocol for the selected rack, the execution of the placement protocol includes using the model to determine a new configuration of virtual machines to use for provisioning the new instance of the cloud application, wherein the new configuration indicates an expected number of new virtual machines and an expected memory allocation for each new virtual machine, wherein the placement protocol iteratively maps each new virtual machine of the expected number of new virtual machines to a server of the set of servers according to the expected memory allocation of each new virtual machine; and
provision the new instance of the cloud application using the expected of new virtual machines.

2. The non-transitory computer readable medium of claim 1, wherein the computer-executable instructions, upon execution by the one or more processors, further cause the one or more processors to:
identify that the request corresponds to the cloud application; and
in response to determining that the request corresponds to the cloud application, access the model that corresponds to the cloud application.

3. The non-transitory computer readable medium of claim 2, wherein the computer-executable instructions, upon execution by the one or more processors, further cause the one or more processors to:
determine an amount of unused resources corresponding to the set of servers after the placement protocol has been executed.

4. The non-transitory computer readable medium of claim 1, wherein each rack of the plurality of racks is associated with a priority setting, and wherein the priority setting represents a priority associated with selecting the associated rack.

5. The non-transitory computer readable medium of claim 1, wherein the resource includes at least an amount of memory and a number of central processing units (CPUs).

6. The non-transitory computer readable medium of claim 1, wherein executing the placement protocol further includes:
iteratively selecting a new virtual machine from the expected number of new virtual machines;
for each server of the set of servers:
fitting the new virtual machine into the server, and
calculating a score representing a degree to which the new virtual machine fits into the server;
selecting the server associated with a highest score; and
mapping the selected new virtual machine to the selected server.

7. The non-transitory computer readable medium of claim 6, wherein the score includes a plurality of components, wherein the plurality of components includes a "fill" score, a "fit" score, and a "balance" score, and wherein:
the "fill" score represents indicate a degree to which an empty server is preferred or a partially full server is preferred,
the "fit" score represents a degree to which the selected new virtual machine fits into the selected server based on remaining unused resources after fitting the new virtual machine, and
the "balance" score represents a degree to which resource usage balances one dimension over another dimension of the selected server.

8. A computer-implemented method, comprising:
collecting, by a computer infrastructure system, historical provision data for a plurality of racks, each rack of the plurality of racks being associated with one or more servers configured to provision a cloud application, the historical provision data representing one or more configurations of virtual machines previously used to provision at least one previous instance of the cloud application, and each configuration of the one or more configurations indicating a number of virtual machines used to provision a previous instance and a memory allocation of each virtual machine of the number of virtual machines used;
analyzing the historical provision data using one or more machine-learning techniques;
generating, based at least in part on the analyzing, a model that represents a distribution across the one or more configurations of the number of virtual machines used and the memory allocation of each virtual machine of the number of virtual machines used;
receiving a request for the computer infrastructure system to provision a new instance of the cloud application;
selecting a rack from the plurality of racks, the selected rack being configured to run the new instance of the cloud application, the selected rack corresponding to a set of servers, and each server of the set of servers being associated with a resource;
executing, at a runtime, a placement protocol for the selected rack, the execution of the placement protocol includes using the model to determine a new configuration of virtual machines to use for provisioning the new instance of the cloud application, wherein the new configuration indicates an expected number of new virtual machines and an expected memory allocation for each new virtual machine, wherein the placement protocol iteratively maps each new virtual machine of the expected number of new virtual machines to a server of the set of servers according to the expected memory allocation of each new virtual machine; and
provisioning the new instance of the cloud application using the expected of new virtual machines.

9. The computer-implemented method of claim 8, further comprising:
identifying that the request corresponds to the cloud application; and
in response to determining that the request corresponds to the cloud application, accessing the model that corresponds to the cloud application.

10. The computer-implemented method of claim 9, further comprising:
determining an amount of unused resources corresponding to the set of servers after the placement protocol has been executed.

11. The computer-implemented method of claim 8, wherein each rack of the plurality of racks is associated with a priority setting, and wherein the priority setting represents a priority associated with selecting the associated rack.

12. The computer-implemented method of claim 8, wherein the resource includes at least an amount of memory and a number of central processing units (CPUs).

13. The computer-implemented method of claim 8, wherein executing the placement protocol further includes:
iteratively selecting a new virtual machine from the set expected number of new virtual machines;
for each server of the set of servers:
fitting the new virtual machine into the server, and
calculating a score representing a degree to which the new virtual machine fits into the server;
selecting the server associated with a highest score; and
mapping the selected new virtual machine to the selected server.

14. The computer-implemented method of claim 13, wherein the score includes a plurality of components, wherein the plurality of components includes a "fill" score, a "fit" score, and a "balance" score, and wherein:
the "fill" score represents indicate a degree to which an empty server is preferred or a partially full server is preferred,
the "fit" score represents a degree to which the selected new virtual machine fits into the selected server based on remaining unused resources after fitting the new virtual machine, and
the "balance" score represents a degree to which resource usage balances one dimension over another dimension of the selected server.

15. A system, comprising:
one or more processors; and
a non-transitory computer-readable storage medium containing instructions which, when executed on the one or more processors, cause the one or more processors to perform operations including:
collecting, by a computer infrastructure system, historical provision data for a plurality of racks, each rack of the plurality of racks being associated with one or more servers configured to provision a cloud application, the historical provision data representing one or more configurations of virtual machines previously used to provision at least one previous instance of the cloud application, and each configuration of the one or more configurations indicating a number of virtual machines used to provision a previous instance and a memory allocation of each virtual machine of the number of virtual machines used;
analyzing the historical provision data using one or more machine-learning techniques;
generating, based at least in part on the analyzing, a model that represents a distribution across the one or more configurations of the number of virtual machines used and the memory allocation of each virtual machine of the number of virtual machines used;
receiving a request for the computer infrastructure system to provision a new instance of the cloud application;
selecting a rack from the plurality of racks, the selected rack being configured to run the new instance of the cloud application, the selected rack corresponding to a set of servers, and each server of the set of servers being associated with a resource;
executing, at a runtime, a placement protocol for the selected rack, the execution of the placement protocol includes using the model to determine a new configuration of virtual machines to use for provisioning the new instance of the cloud application, wherein the new configuration indicates an expected number of new virtual machines and an expected memory allocation for each new virtual machine, wherein the placement protocol iteratively maps each new virtual machine of the expected number of new virtual machines to a server of the set of servers according to the expected memory allocation of each new virtual machine; and
provisioning the new instance of the cloud application using the expected of new virtual machines.

16. The system of claim 15, wherein the operations further comprise:
identifying that the request corresponds to the cloud application; and
in response to determining that the request corresponds to the cloud application, accessing the model that corresponds to the cloud application.

17. The system of claim 16, wherein the operations further comprise:
determining an amount of unused resources corresponding to the set of servers after the placement protocol has been executed.

18. The system of claim 15, wherein each rack of the plurality of racks is associated with a priority setting, and wherein the priority setting represents a priority associated with selecting the associated rack.

19. The system of claim 15, wherein executing the placement protocol further includes:
iteratively selecting a new virtual machine from the expected number of new virtual machines;
for each server of the set of servers:
fitting the new virtual machine into the server, and
calculating a score representing a degree to which the new virtual machine fits into the server;
selecting the server associated with a highest score; and
mapping the selected new virtual machine to the selected server.

20. The system of claim 19, wherein the score includes a plurality of components, wherein the plurality of components includes a "fill" score, a "fit" score, and a "balance" score, and wherein:
the "fill" score represents indicate a degree to which an empty server is preferred or a partially full server is preferred,
the "fit" score represents a degree to which the selected new virtual machine fits into the selected server based on remaining unused resources after fitting the new virtual machine, and
the "balance" score represents a degree to which resource usage balances one dimension over another dimension of the selected server.

* * * * *

UNITED STATES PATENT AND TRADEMARK OFFICE
CERTIFICATE OF CORRECTION

PATENT NO. : 10,979,318 B2
APPLICATION NO. : 15/889986
DATED : April 13, 2021
INVENTOR(S) : Meyer et al.

Page 1 of 1

It is certified that error appears in the above-identified patent and that said Letters Patent is hereby corrected as shown below:

In the Claims

In Column 37, Line 10, in Claim 13, after "from the" delete "set".

Signed and Sealed this
Third Day of August, 2021

Drew Hirshfeld
*Performing the Functions and Duties of the
Under Secretary of Commerce for Intellectual Property and
Director of the United States Patent and Trademark Office*